United States Patent [19]

Knox et al.

[11] 4,256,424
[45] Mar. 17, 1981

[54] RATTLE-PROOF ANCHOR FITTING FOR SECURING LOADS TO A RETAINER TRACK

[75] Inventors: Howard T. Knox, Simi; James E. McAtee, El Segundo, both of Calif.

[73] Assignee: Ancra Corporation, El Segundo, Calif.

[21] Appl. No.: 67,775

[22] Filed: Aug. 20, 1979

[51] Int. Cl.³ .................... B60P 7/08; B61D 45/00
[52] U.S. Cl. ................................. 410/105; 410/104
[58] Field of Search ........................ 410/103, 104, 105

[56] References Cited

U.S. PATENT DOCUMENTS

| 2,688,504 | 9/1954 | Parker | 410/105 |
| 3,605,637 | 9/1971 | Prete, Jr. | 410/105 |
| 3,677,195 | 7/1972 | Prete, Jr. | 410/105 |
| 4,026,218 | 5/1977 | Prete, Jr. et. al. | 410/104 |
| 4,109,891 | 8/1978 | Grenjahl | 410/105 |

Primary Examiner—Richard A. Bertsch
Attorney, Agent, or Firm—Edward A. Sokolski

[57] ABSTRACT

An anchor fitting for removably securing a load to a slotted track member at preselected positions therealong, such as for example for securing cargo, passenger seats, etc. in various positions along the floor of an aircraft. The fitting has flat surface pads with shoulders extending therefrom and a post portion extending along an axis substantially normal to the flat surfaces of the pads. A latching plunger is slidably mounted on the post portion for motion along the longitudinal axis thereof. The fitting is removably retained in the track which has a plurality of notched portions separated by narrow neck portions with the plunger member seated in one of the notched portions of the track and with the surface pad shoulders of the fitting beneath the flanges. A clamp member having a U-shaped portion which slidably fits over the body of the fitting has flanges which extend outwardly therefrom. Adjustment means in the form of a screw member is used to slidably adjust the position of the clamp member so that it is driven against a pair of the track flanges so as to draw the shoulders of the pads tightly against the track to provide a tight, rattle-proof joinder between the fitting and the track.

3 Claims, 5 Drawing Figures

RATTLE-PROOF ANCHOR FITTING FOR SECURING LOADS TO A RETAINER TRACK

This invention relates to anchor fittings for removably securing a load to a track member at a preselected position therealong, and more particularly to such a device which incorporates a saddletype clamp member for tightly joining the fitting to the track such that rattling of the fitting is obviated.

In vehicles such as aircraft, it is desirable to provide means for selectively anchoring various types of loads, such as cargo, passenger seats, etc., at various points along the floor of such vehicle. The anchoring must be secure and reliable to assure that these loads do not become loose during travel, yet at the same time it is necessary that the anchoring device be removable and reattach with relative ease to permit versatility in loading and conversion from one type of load to another. An anchor fitting for achieving this end result is described in U.S. Pat. No. 3,605,637, issued Sept. 20, 1971, and assigned to Ancra Corporation, the assignee of the present application. It was found that with the fitting described in the aforementioned patent, while secure fitting to the track was provided, oftentimes the fitting and the track were not held against each other tightly enough such that rattling occurred resulting in undesirable noise. In order to obviate this problem, an anti-rattle mechanism was developed involving a cam bar member supported in an apertured portion of the anchor fitting, this cam bar member being adjusted by means of an adjustment screw to draw the shoulders of the pads tightly against the flanges of the track. This improved fitting is described in U.S Pat. No. 4,026,218, issued May 31, 1977, and assigned to Ancra Corporation.

While the "anti-rattle" device of U.S. Pat. No. 4,026,218 operates quite satisfactorily, it was found to be more expensive to manufacture than was to be desired.

The rattle-proof anchor fitting of the present invention, while performing as well as that of the aforementioned patent, is substantially more economical and easier to assembly, and for these reasons affords distinct advantages thereover.

This improved end result is achieved in the present invention by employing a saddle-type clamp which slidably fits over the body of the fitting in a portion thereof which is undercut to form a channel which mates with the clamp. The clamp has a U-shaped portion with a pair of flanges or "wings" extending out from the ends of the legs of the U. An adjustment screw is fitted through the top wall of the U portion and threadably engages the main body of the fitting, there being a spring placed between the inner surface of the top wall of the U and the main body of the clamp so as to resiliently urge the clamp outwardly away from the main body. When the adjustment screw is tightened, the flanges or wings of the clamp are driven downwardly against the flanges of the track, thereby drawing the pad shoulders against the track so as to tightly clamp the fitting thereto.

It is therefore an object of this invention to provide an improved rattle-proof anchor fitting which is more economical and easier to fabricate than prior art fittings.

It is a further object of this invention to provide an improved rattle-proof anchor fitting which is simpler in construction than those of the prior art.

Other objects of the invention will become apparent as the description proceeds in connection with the accompanying drawings in which.

Referring now to the figures, a preferred embodiment of the invention is illustrated. It is to be noted that with the exception of the improved rattle prevention means and minor design differences that this device is basically the same as that described in the aforementioned U.S. Pat. No. 3,605,637.

Figure 4:
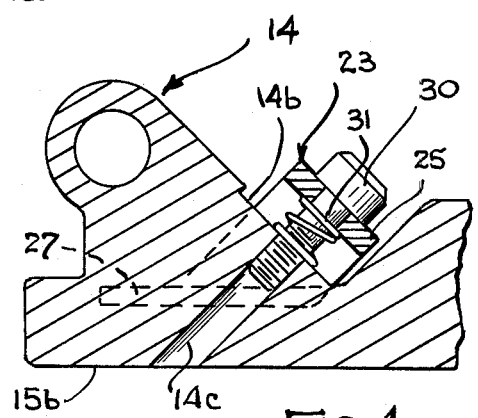
FIG. 4 is a cross-sectional view taken along the plane indicated by 4—4 in FIG. 1.

The anchor fitting includes a main body portion 14 which has a pair of spaced base pads 15 along the bottom portion thereof, these pads having shoulders 15a which extend therefrom. The pads have flat bottom surfaces 15b. At one end of the main body is a post portion 18 which extends vertically, i.e., substantially normal to surfaces 15a. Slidably supported on post 18 for movement parallel to the longitudinal axis thereof is latching plunger member 21. Plunger 21 has a pin member 21a fitted therein, the end of this pin member fitting in groove 18a formed in the post, this groove not extending to either the top or the bottom of the post and thus limiting the vertical movement of the plunger to a bottom position flush with the bottom surface of the post and a top position whereat its bottom surface is substantially above flanges 15a. A ball member 24 is mounted in an identation formed in post 18 to facilitate the motion of the plunger on the post. Undercut side and top undercut portions 14a and 14b of main body 14 form channels which slidably receive saddle-shaped clamp member 23. The clamp member has a U-shaped portion 25, the ends of the legs of the U each having a flange or wing 27 extending therefrom. Flanges 27 have flat surfaces 27a which are substantially parallel to surfaces 15b. Adjustment screw 30 fits through an aperture in the top wall of the U-shaped clamp and threadably engages an apertured portion of the main body 14 as can be best seen in FIG. 4. The clamp is resiliently urged away from the main body portion by means of coil spring 31 inserted between the clamp and the body portion.

Figure 1:
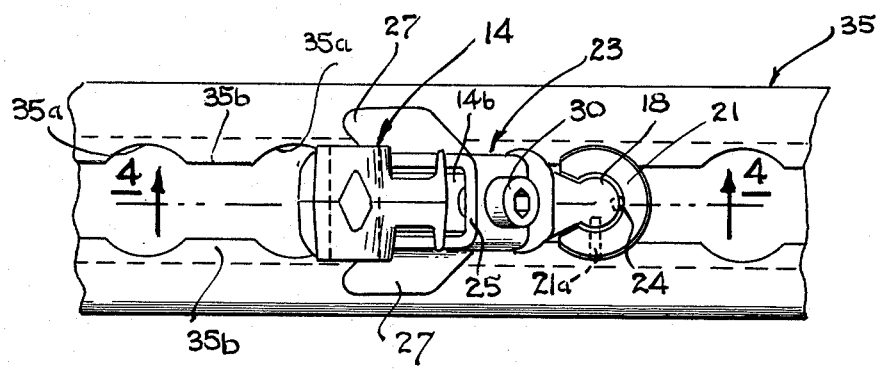
FIG. 1 is a top plan view illustrating a preferred embodiment of the invention attached to a mating track.
Figure 2:
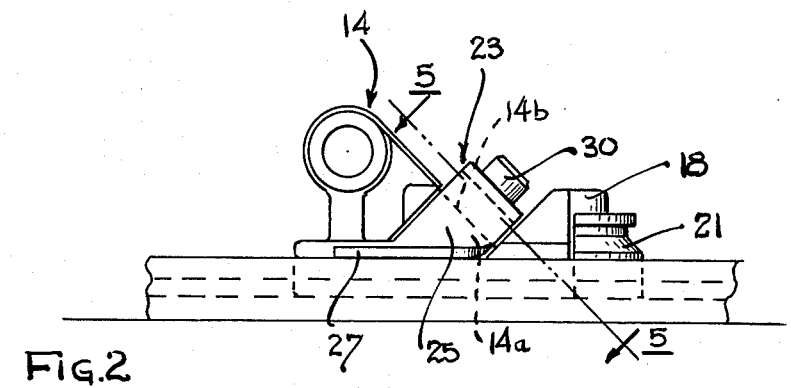
FIG. 2 is a side elevational view of the preferred embodiment installed in a mating track.
Figure 3:
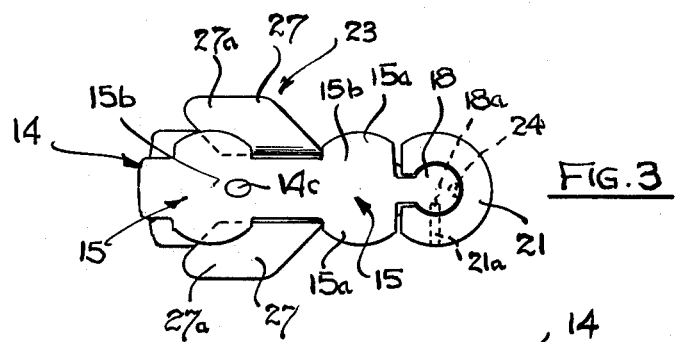
FIG. 3 is a bottom plan view of the preferred embodiment.
Figure 5:
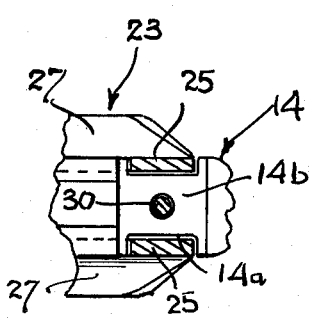
FIG. 5 is a cross-sectional view taken along the plane indicated by 5—5 in FIG. 2.

Referring now particularly to FIGS. 1 and 2, the anchor fitting is retained in track 35 which has notched portions 35a separated from each other by narrow neck portions formed by flanges 35b. Such retention of the fitting in the track is achieved by virtue of the shoulders 15a of pads 15 being positioned beneath mating flanges 35b of the track with plunger 21 lowered down into one of the notch portions to prevent longitudinal movement of the fitting along the track. With the fitting in this position, screw member 30 is turned either manually or with an appropriate wrench to drive the clamp member downwardly, such that its flange or wing portions 27a abut against the track causing the shoulder portions 15a of the fitting to be drawn tightly against the inner walls of the flange portions 35b of the track, thereby obviating rattling between these two members.

It thus can be seen that the present invention provides a simple and economical yet highly effective means for tightly retaining an anchor fitting to a retainer track such that rattling therebetween is prevented.

While the invention has been described and illustrated in detail, it is to be clearly understood that this is intended by way of illustration and example only and is not to be taken by way of limitation, the spirit and scope of this invention being limited only by the terms of the following claims:

We claim:

1. In an anchor fitting for securing loads to a retainer track, said track having a top surface, a longitudinal slot and spaced notch portions separated by neck portions formed by a pair of oppositely positioned flanges, the anchor fitting having a main body portion, a pair of pad members extending from said main body portion and positioned in the track slot under said pair of flanges and a latching plunger member slidably positioned on the main body portion and positioned in one of the track member notches, the improvement being means for clamping the fitting to said track to prevent rattling therebetween comprising:

a clamp member having a U-shaped portion and a pair of flange portions extending outwardly away from the ends of the "U" of the U-shaped portion, said flange portions having substantially flat bottom surfaces which are substantially parallel to the bottom surfaces of said pad members, undercut portions in said fitting forming channels shaped to slidably receive the U-shaped portion of said clamp in mating relationship therewith, and adjustment means fitted through the top wall of said U-shaped portion and engaging the main body of the fitting for use in moving the clamp in said channels towards the retaining track and driving the flange portions of said clamp member against the track, whereby the shoulders of said fitting are drawn against the inner surfaces of the track into tight engagement therewith.

2. The device of claim 1 wherein said means for driving the clamp member comprises a screw which is fitted through the top wall of the U-shaped portion of the clamp member and which threadably engages the main body portion of said fitting 3. The device of claim 2 and further including spring means positioned between the main body portion of the fitting and the clamp member for resiliently urging the clamp member away from the main body portion of the fitting.

* * * * *